(12) United States Patent
Shintani et al.

(10) Patent No.: US 10,790,526 B2
(45) Date of Patent: Sep. 29, 2020

(54) ELECTRODE CATALYST LAYER OF ELECTROCHEMICAL DEVICE, MEMBRANE ELECTRODE ASSEMBLY OF ELECTROCHEMICAL DEVICE, AND ELECTROCHEMICAL DEVICE

(71) Applicant: Panasonic Intellectual Property Management Co., Ltd., Osaka (JP)

(72) Inventors: Haruhiko Shintani, Osaka (JP); Yusuke Fujita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 15/939,400

(22) Filed: Mar. 29, 2018

(65) Prior Publication Data

US 2018/0301726 A1    Oct. 18, 2018

(30) Foreign Application Priority Data

Apr. 17, 2017    (JP) .................................. 2017-081262

(51) Int. Cl.
 *H01M 4/92* (2006.01)
 *H01M 8/1004* (2016.01)
 (Continued)

(52) U.S. Cl.
 CPC ........... *H01M 8/1004* (2013.01); *B82Y 30/00* (2013.01); *H01M 4/8605* (2013.01);
 (Continued)

(58) Field of Classification Search
 CPC .. H01M 4/926; H01M 4/8807; H01M 4/8828; H01M 4/8605; H01M 4/8673;
 (Continued)

(56) References Cited

U.S. PATENT DOCUMENTS 6,277,513 B1 *  8/2001  Swathirajan ........ H01M 4/8605
                                                    29/746
2006/0263288 A1  11/2006  Pak et al.
(Continued)

FOREIGN PATENT DOCUMENTS

CA         2966141 A1      5/2016
JP       2010-208887       9/2010
(Continued)

OTHER PUBLICATIONS

The Extended European Search Report dated Jul. 3, 2018 for the related European Patent Application No. 18165865.9.
(Continued)

*Primary Examiner* — Amanda C. Walke
(74) *Attorney, Agent, or Firm* — McDermott Will & Emery LLP

(57) ABSTRACT

An electrode catalyst layer of an electrochemical device is an electrode catalyst layer of an electrochemical device, the electrode catalyst layer including a mesoporous carbon; a catalyst metal supported at least in the mesoporous carbon; and an ionomer. Before supporting the catalyst metal, the mesoporous carbon has mesopores with a mode radius of 1 nm to 25 nm and a pore volume of 1.0 cm³/g to 3.0 cm³/g and has an average particle diameter of 200 nm or more.

7 Claims, 5 Drawing Sheets

(51) Int. Cl.
  *H01M 8/1039* (2016.01)
  *H01M 4/88* (2006.01)
  *H01M 4/86* (2006.01)
  *B82Y 30/00* (2011.01)
  *H01M 8/1018* (2016.01)

(52) U.S. Cl.
  CPC ....... *H01M 4/8652* (2013.01); *H01M 4/8807* (2013.01); *H01M 4/8828* (2013.01); *H01M 4/926* (2013.01); *H01M 8/1039* (2013.01); *H01M 2004/8684* (2013.01); *H01M 2004/8689* (2013.01); *H01M 2008/1095* (2013.01)

(58) Field of Classification Search
  CPC ....... H01M 4/9083; H01M 2008/1095; H01M 8/1004; H01M 8/1039; H01M 2004/8684; H01M 2004/8689
  USPC .......................................................... 429/483
  See application file for complete search history.

(56) References Cited

U.S. PATENT DOCUMENTS

| | | | |
|---|---|---|---|
| 2011/0287336 A1* | 11/2011 | Himeno | H01M 8/0213 429/492 |
| 2011/0318254 A1 | 12/2011 | Morishita | |
| 2014/0302981 A1* | 10/2014 | Bohringer | B01D 39/06 502/10 |
| 2015/0030966 A1* | 1/2015 | Shimoi | H01M 4/926 429/524 |
| 2015/0295250 A1* | 10/2015 | Nagami | H01M 4/926 429/524 |
| 2016/0064744 A1 | 3/2016 | Mashio et al. | |
| 2016/0079606 A1 | 3/2016 | Mashio et al. | |
| 2016/0087281 A1* | 3/2016 | Mashio | H01M 4/8605 429/482 |
| 2016/0093892 A1 | 3/2016 | Hori et al. | |
| 2017/0084927 A1 | 3/2017 | Banham et al. | |
| 2017/0104222 A1* | 4/2017 | Ikehata | H01M 4/8605 |
| 2017/0104223 A1* | 4/2017 | Kaneko | H01M 4/8605 |
| 2017/0207463 A1* | 7/2017 | Arai | H01M 4/8817 |
| 2017/0244125 A1* | 8/2017 | Takahashi | B01J 23/42 |
| 2017/0331134 A1* | 11/2017 | Iden | H01M 8/1004 |
| 2017/0338496 A1* | 11/2017 | Takahashi | H01M 4/92 |
| 2018/0166696 A1* | 6/2018 | Itoh | H01M 4/926 |
| 2018/0166697 A1* | 6/2018 | Yamamoto | C01B 32/00 |

FOREIGN PATENT DOCUMENTS

| | | |
|---|---|---|
| WO | 2014/175101 A1 | 10/2014 |
| WO | 2014/175106 | 10/2014 |
| WO | 2014/185498 | 11/2014 |

OTHER PUBLICATIONS

The Extended European Search Report dated Feb. 7, 2020 for the related European Patent Application No. 18165865.9.

* cited by examiner

FIG. 7

|  | SUPPORT A | SUPPORT B | SUPPORT C | SUPPORT D |
|---|---|---|---|---|
| AVERAGE PARTICLE DIAMETER | 4.0 μm | 0.42 μm | 0.37 μm | 0.19 μm |
| MESOPORE VOLUME (RADIUS 2-10 nm) | 2.5 cm$^3$/g | 1.8 cm$^3$/g | 1.6 cm$^3$/g | 1.4 cm$^3$/g |
| MESOPORE MODE RADIUS | 3.9 nm | 3.3 nm | 3.3 nm | 4.8 nm |
| BET SPECIFIC SURFACE AREA | 1600 m$^2$/g | 1300 m$^2$/g | 1330 m$^2$/g | 1300 m$^2$/g |

FIG. 8

| | CATALYST A (EXAMPLE 1) | CATALYST B (EXAMPLE 2) | CATALYST C (EXAMPLE 3) | CATALYST D (COMPARATIVE EXAMPLE 1) | CATALYST E (COMPARATIVE EXAMPLE 2) |
|---|---|---|---|---|---|
| CARBON SUPPORT | SUPPORT A | SUPPORT B | SUPPORT C | SUPPORT D | KETJEN BLACK EC |
| PLATINUM SUPPORTING RATE | 46.5 wt% | 44.4 wt% | 45.8 wt% | 44.1 wt% | 46.5 wt% |
| PLATINUM SPECIFIC SURFACE AREA (CO ADSORPTION METHOD) | 185 m$^2$/g-Pt | 163 m$^2$/g-Pt | 183 m$^2$/g-Pt | 180 m$^2$/g-Pt | 174 m$^2$/g-Pt |
| BET SPECIFIC SURFACE AREA (NITROGEN ADSORPTION METHOD) | 673 m$^2$/g-Cat | 599 m$^2$/g-Cat | 619 m$^2$/g-Cat | 587 m$^2$/g-Cat | 338 m$^2$/g-Cat |

ELECTRODE CATALYST LAYER OF
ELECTROCHEMICAL DEVICE, MEMBRANE
ELECTRODE ASSEMBLY OF
ELECTROCHEMICAL DEVICE, AND
ELECTROCHEMICAL DEVICE

BACKGROUND

1. Technical Field

The present disclosure relates to an electrode catalyst layer used in an electrochemical device, a membrane electrode assembly including the electrode catalyst layer, and an electrochemical device using the membrane electrode assembly.

2. Description of the Related Art

As one example of an electrochemical device, a fuel cell has been known. For example, a polymer electrolyte fuel cell includes a membrane electrode assembly (MEA) for an electrochemical reaction (power generation reaction) performed between a fuel gas containing hydrogen and an oxidizing gas containing oxygen.

In general, an electrode catalyst layer forming the membrane electrode assembly is formed in such a way that after a catalyst paste is formed by dispersing a catalyst in which a catalyst metal, such as platinum, is supported on an electrically conductive material, such as carbon black, and a polymer electrolyte (hereinafter, referred to as "ionomer") having a proton conductivity in a solvent, such as water and/or an alcohol, this catalyst paste is applied to a polymer electrolyte membrane or another substrate, followed by drying.

In addition, in order to reduce poisoning of a catalyst metal caused by an ionomer, a method in which after catalyst metal particles are supported in a support formed from a mesoporous carbon, the support which supports the above particles is covered with an ionomer has been proposed (see, for example, International Publication Nos. WO 2014/175106 and WO 2014/185498).

SUMMARY

One non-limiting and exemplary embodiment provides an electrode catalyst layer of an electrochemical device, the electrode catalyst layer capable of reducing poisoning of a catalyst metal caused by an ionomer, a membrane electrode assembly of an electrochemical device, and an electrochemical device.

In one general aspect, the techniques disclosed here feature an electrode catalyst layer of an electrochemical device, the electrode catalyst layer comprising: a mesoporous material; a catalyst metal supported at least in the mesoporous material; and an ionomer. In addition, before supporting the catalyst metal, the mesoporous material has mesopores with a mode radius of 1 nm to 25 nm and a pore volume of 1.0 cm$^3$/g to 3.0 cm$^3$/g and has an average particle diameter of 200 nm or more.

The present disclosure is formed as described above and has an effect of reducing the poisoning of the catalyst metal caused by the ionomer.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a table showing the average particle diameter, a mesopore volume, a mesopore mode radius, and the BET specific surface area of each of mesoporous carbon supports according to examples of the present disclosure; and FIG. 8 is a table showing a carbon support, a platinum supporting rate, a platinum specific surface area, and the BET specific surface area of each of catalysts according to the examples of the present disclosure.

DETAILED DESCRIPTION

Underlying Knowledge Forming Basis of the Present Disclosure

As described above, in general, an electrode catalyst layer of a membrane electrode assembly is formed in such a way that after a catalyst paste is formed by dispersing a catalyst in which a catalyst metal, such as platinum, is supported on an electrically conductive material, such as carbon black, and an ionomer having a proton conductivity in a solvent, such as water and/or an alcohol, the catalyst paste thus formed is applied to a polymer electrolyte membrane or another substrate, followed by drying.

A microstructure (hereinafter, referred to as "three-phase interface structure") of the electrode catalyst layer thus formed has a structure in which the catalyst is covered with the ionomer. In this three-phase interface structure, in view of proton supply to the catalyst metal surface, heretofore, it has been believed that the performance is improved when the catalyst metal is in contact with the ionomer. However, in recent years, it has been found that by the contact with the ionomer, the catalyst metal is poisoned. Hence, it is pointed out that the contact between the catalyst metal and the ionomer degrades the performance.

In order to overcome the problem as described above, International Publication Nos. WO 2014/175106 and WO 2014/185498 each have proposed a method in which a metal catalyst is enclosed in a carbon support, such as a mesoporous carbon, having large volume pores, so as to avoid the contact between the metal catalyst and an ionomer. In particular, International Publication No. WO 2014/175106 has disclosed a technique in which platinum alloy fine particles having a catalytic function are supported in a mesoporous carbon having mesopores with a radius of 1 to 10 nm and a mode radius of 2.5 to 10 nm. In addition, International Publication No. WO 2014/185498 has disclosed a method in which after a mesoporous carbon having a crystallite diameter Lc in the 002 plane of 1.5 nm or less is processed by a heat treatment performed at 1,700° C. to less than 2,300° C. so that mesopores having a diameter (pore diameter) of 2 to 10 nm have a mesopore specific surface area of 400 $m^2/g$ or more, a catalyst metal is supported in the support obtained by this heat treatment.

However, through intensive research carried out by the present inventors, it was found that even if an electrode catalyst layer in which a catalyst metal (such as Pt) is enclosed in mesopores having a radius of 1 to 10 nm (diameter of 2 to 20 nm) is used, this method cannot sufficiently reduce the poisoning of the catalyst metal caused by the ionomer, and that in some cases, the catalyst activity obtained thereby may be approximately equivalent to or lower than that of a related catalyst using carbon black as the support.

Figure 1:
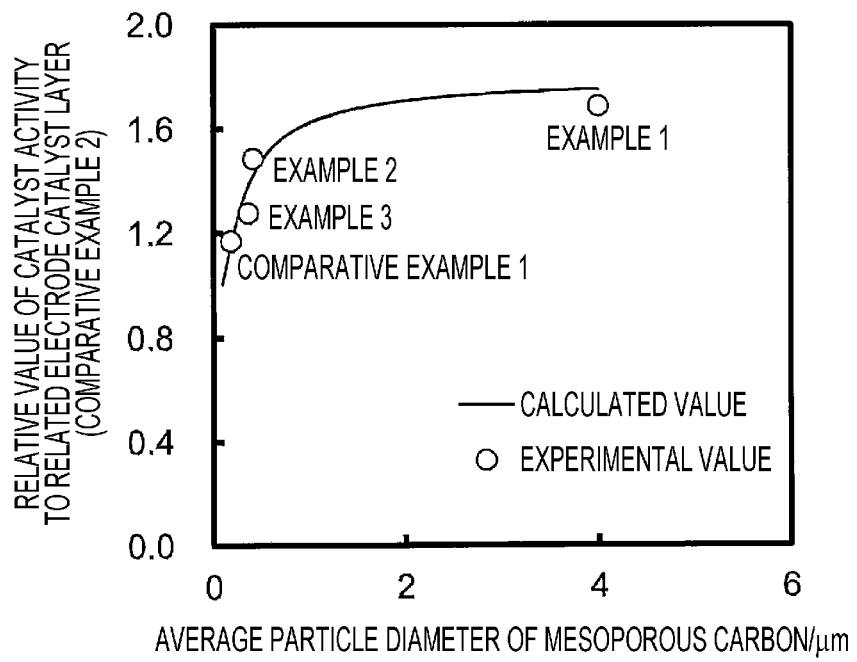
FIG. 1 is a graph showing one example of the relationship between the average particle diameter of a mesoporous carbon and the value of catalyst activity relative to that of a related electrode catalyst layer.

Accordingly, through research carried out by the present inventors on the electrode catalyst layer which reduces the poisoning of the catalyst metal caused by the ionomer, it was found that there is a clear relationship between the particle diameter of a mesoporous carbon and the catalyst activity, and as a result, the present disclosure was made. In particular, the relationship between the average particle diameter (d50) of the mesoporous carbon and the catalyst activity as shown in FIG. 1 was discovered. FIG. 1 is a graph showing one example of the relationship between the average particle diameter of the mesoporous carbon and the value of catalyst activity relative to that of a related electrode catalyst layer (Comparative Example 1 which will be described later). In addition, the related electrode catalyst layer is an electrode catalyst layer in which a catalyst metal is supported by an electrically conductive carbon black and is then covered with an ionomer, and the detail of this related electrode catalyst layer will be described as Comparative Example 2 in the column of "EXAMPLES" to be described later.

In addition, in this specification, the mesoporous carbon is regarded as a porous carbon which has mesopores with a radius of 1 to 25 nm and in which a pore structure can be arbitrarily controlled, for example, by changing a casting mold and/or a carbon source or by controlling synthetic conditions, such as a reaction temperature. It should be noted that the material used for the catalyst layer of the present disclosure is not limited to a mesoporous carbon. Other mesoporous materials which have same mode radius and pore volume as a mesoporous carbon provide same effect. The other mesoporous material may be metal oxide, for example, titanium oxide, tin oxide, niobium oxide, tantalum oxide, zirconium oxide, aluminum oxide, and silicon oxide.

Incidentally, the mechanism why the relationship between the particle diameter of the mesoporous carbon and the catalyst activity is generated may be considered as described below. Heretofore, it has been believed that since the size of an ionomer in a catalyst ink is several tens of nanometers, the ionomer cannot intrude into mesopores having a radius of 1 to 10 nm, and as a result, Pt which is a catalyst metal enclosed in the mesoporous carbon is free from being poisoned by the ionomer.

However, in practice, depending on the distribution in size of ionomers and the distribution in size of mesopores, the ionomer may partially intrude into the mesopores in some cases. In addition, since the ionomer is likely to be adsorbed to Pt, an ionomer which intrudes into the mesopores is adsorbed on Pt located in the vicinity of the surface of the mesoporous carbon, so that the catalytic activity of Pt is degraded.

Figure 2:
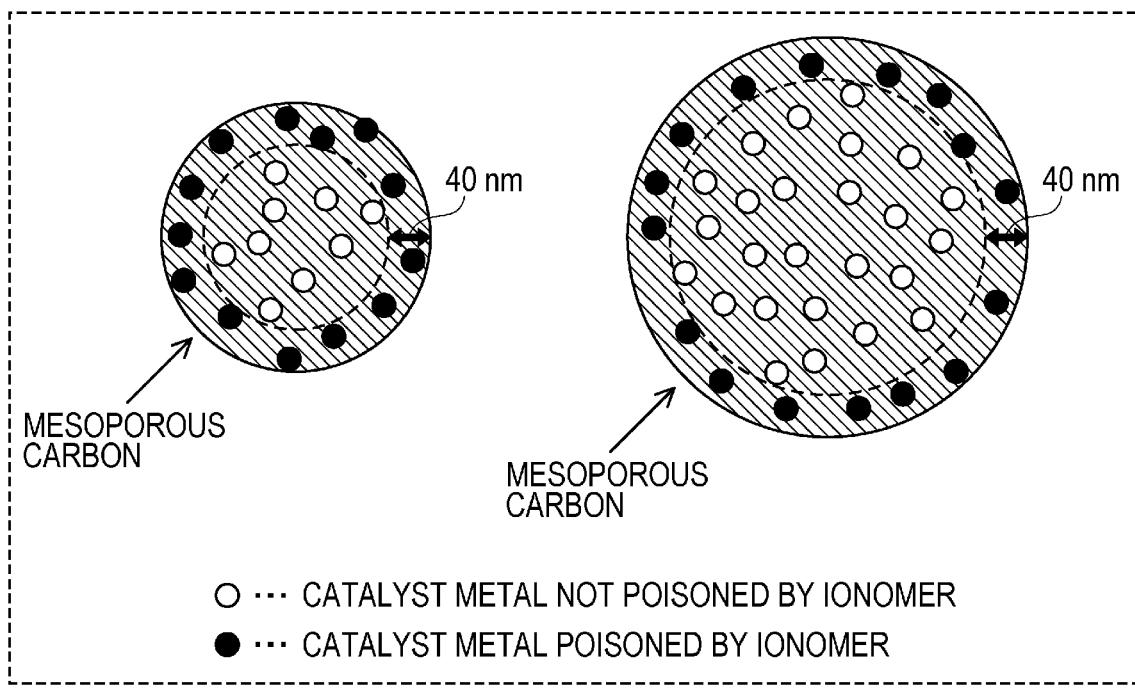
FIG. 2 includes views showing the relationship between poisoning caused by an ionomer and the particle diameter of a mesoporous carbon.

Accordingly, it is believed that even in the mesoporous carbon, Pt in the vicinity of the surface of the mesoporous carbon is liable to be poisoned by the ionomer. That is, as shown in FIG. 2, it is believed that when the particle diameter of the mesoporous carbon is small, since the rate of Pt present in the vicinity of the surface thereof is increased as compared to that of a mesoporous carbon having a large particle diameter, the poisoning caused by the ionomer is increased, and as a result, the catalyst activity is degraded. FIG. 2 is a schematic view showing the relationship between the particle diameter of the mesoporous carbon and the poisoning caused by the ionomer. In FIG. 2, a white circle represents a catalyst metal not poisoned by the ionomer, and a black circle represents a catalyst metal poisoned by the ionomer. In addition, a circle shown by a solid line enclosing the black circles and the white circles indicates the particle diameter of the mesoporous carbon. In FIG. 2, the particle diameter of the mesoporous carbon located at a left side of the plane is smaller than that of the mesoporous carbon located at a right side of the plane. In addition, a circle shown by a dotted line in the mesoporous carbon indicates the boundary between a region to be poisoned by the ionomer and a region not to be poisoned by the ionomer.

In addition, the solid line in the graph shown in FIG. 1 is the result (calculated value) of the catalyst activities of catalysts in which Pt is enclosed in mesoporous carbons having various particle diameters, the result being obtained by calculation based on the following assumption. First, Pt is assumed to be uniformly present in the particle of the mesoporous carbon as shown in FIG. 2, and Pt located at a distance of 40 nm or less apart from the surface of the mesoporous carbon is assumed to be poisoned by the ionomer. Furthermore, the catalyst activity of Pt to be poisoned is assumed to be the same as that of a related catalyst using carbon black as the support, and the catalyst activity of Pt not to be poisoned is assumed to be 1.8 times that of the above related catalyst using carbon black as the support based on the knowledge disclosed, for example, in "Journal of The Electrochemical Society", 162 (12) F1384-F1396 (2015), written by Kazuma Shinozaki, Jason W. Zack, Svitlana Pylypenko, Bryan S. Pivovar, and Shyam S. Kocha. In the relationship between the average particle diameter of the mesoporous carbon and the catalyst activity calculated as described above, as shown by the solid line shown in FIG. 1, the relative value of the activity is rapidly changed until the average particle diameter of the mesoporous carbon is about to reach approximately 1,000 nm, and then, the relative value becomes approximately constant. In addition, since the solid line showing the relationship between the catalyst activity thus calculated and the average particle diameter of the mesoporous carbon has a good coincide with the actual experimental results (Comparative Example 1 and Examples 1 to 3 shown in the column of "EXAMPLES" to be described later), the mechanism described above can be regarded as a reasonable assumption.

In addition, Comparative Example 1 and Examples 1 to 3 each indicate the result obtained by an experiment performed using a single cell of a fuel cell, the single cell using a membrane electrode assembly including an electrode catalyst layer in which a catalyst metal is supported in one of mesoporous carbon supports having different average particle diameters. The average particle diameter of the mesoporous carbon support is increased from Comparative Example 1, Example 3, Example 2, to Example 1 in this order. In addition, Comparative Example 2 indicates the result obtained by an experiment performed using a single cell of a fuel cell, the single cell using a membrane electrode assembly including an electrode catalyst layer in which a catalyst metal is supported by Ketjen black EC as the carbon black. In addition, the details of Comparative Examples 1 and 2 and Examples 1 to 3 will be described in the column of "EXAMPLES" to be described later.

The knowledge of the present inventors described above has not been disclosed in the past and includes novel technical characteristics which can obtain a significant operational effect. Accordingly, in particular, the present disclosure provides the following aspects.

An electrode catalyst layer of an electrochemical device according to a first aspect of the present disclosure is an electrode catalyst layer of an electrochemical device, comprising: a mesoporous material; a catalyst metal supported at least in the mesoporous material; and an ionomer, and before supporting the catalyst metal, the mesoporous material has mesopores with a mode radius of 1 nm to 25 nm and a pore volume of 1.0 cm$^3$/g to 3.0 cm$^3$/g and has an average particle diameter of 200 nm or more.

In addition, the mode radius indicates the most frequent radius (radius at which the maximum value is obtained) in the mesopore diameter distribution of a mesoporous material, and the average particle diameter indicates the median diameter (d50) of the particle diameter distribution of a mesoporous material.

According to the structure described above, since the mesoporous material in which the mode radius and the pore volume of the mesopores are controlled as described above, and the average particle diameter is controlled to 200 nm or more is included, the poisoning of the catalyst metal caused by the ionomer can be reduced. In addition, for example, compared to an electrode catalyst layer for a known fuel cell using an electrically conductive carbon black as the support, a significant catalyst activation effect can be obtained.

Hence, the electrode catalyst layer of the electrochemical device according to the first aspect of the present disclosure has an effect of reducing the poisoning of the catalyst metal caused by the ionomer.

In an electrode catalyst layer of an electrochemical device according to a second aspect of the present disclosure, the average particle diameter of the mesoporous material according to the above first aspect may be 800 nm or less.

According to the structure described above, since the average particle diameter of the mesoporous material is set to 800 nm or less, a sufficient reaction gas can be supplied to the catalyst metal supported in the mesoporous material. Hence, when the electrode catalyst layer of the electrochemical device according to the present disclosure is used, for example, as an electrode catalyst layer of a fuel cell, the power generation performance of the fuel cell can be improved.

In an electrode catalyst layer of an electrochemical device according to a third aspect of the present disclosure, the mode radius of the mesopores according to the above first or the second aspect may be 3 nm to 6 nm.

According to the structure described above, since the mode radius of the mesopores of the mesoporous material is set to 3 nm to 6 nm, while the ionomer is suppressed from deeply intruding into the mesoporous material, a reaction gas can be efficiently supplied to the catalyst metal in the mesoporous material.

In one of the first to the third aspects described above, an electrode catalyst layer of an electrochemical device according to a fourth aspect of the present disclosure may further comprise at least one of carbon black and carbon nanotubes.

According to the structure described above, since the electrode catalyst layer further comprises at least one of carbon black and carbon nanotubes, compared to the structure in which the above carbon material is not included, a drainage property can be enhanced. Hence, the electrode catalyst layer of the electrochemical device according to the fifth aspect of the present disclosure can improve, for example, the performance of an electrochemical device, such as a fuel cell.

In an electrode catalyst layer of an electrochemical device according to a fifth aspect of the present disclosure, the carbon black according to the above fourth aspect may be Ketjen black.

In an electrode catalyst layer of an electrochemical device according to a sixth aspect of the present disclosure, the mesoporous material according to one of the first to fifth aspect described above may be a mesoporous carbon.

In an electrode catalyst layer of an electrochemical device according to a seventh aspect of the present disclosure, a weight ratio of the catalyst metal to the mesoporous material according to sixth aspect described above may be 0.65 to 1.5.

According to the structure described above, since the weight ratio of the catalyst metal is set to 0.65 to 1.5, the catalyst metal can be prevented from being agglomerated by an excessive amount thereof per unit area of the mesoporous material. In addition, when the amount of the catalyst metal per unit area of the mesoporous material is small, in order to secure a required amount of the catalyst metal, if the amount of the mesoporous material is increased, the thickness of the electrode catalyst layer may be excessively increased thereby; however, when the weight ratio is controlled as described above, the problem described above can be prevented.

In an electrode catalyst layer of an electrochemical device according to a eighth aspect of the present disclosure, a weight ratio of the ionomer to a total of carbon included in the electrode catalyst layer according to sixth or seventh aspect may be 0.7 to 0.9.

A membrane electrode assembly according to an ninth aspect of the present disclosure comprises: a polymer electrolyte membrane; an anode on a one side of the polymer electrolyte membrane; and a cathode on another side opposite to the one side of the polymer electrolyte membrane, the anode and cathode each including an electrode catalyst layer and a gas diffusion layer. In the membrane electrode assembly described above, the electrode catalyst layer of the cathode is at least an electrode catalyst layer of an electrochemical device, the electrode catalyst layer comprising: a mesoporous material; a catalyst metal supported at least in the mesoporous material; and an ionomer, and before supporting the catalyst metal, the mesoporous material has mesopores with a mode radius of 1 nm to 25 nm and a pore volume of 1.0 cm$^3$/g to 3.0 cm$^3$/g and has an average particle diameter of 200 nm or more.

According to the structure described above, since the cathode at least includes the electrode catalyst layer which includes the mesoporous material controlled to have the mode radius and the pore volume of the mesopores described above and to have an average particle diameter of 200 nm or more, the poisoning of the catalyst metal caused by the ionomer can be reduced at least at a cathode side.

Hence, the membrane electrode assembly of the electrochemical device according to the eighth aspect of the present disclosure has an effect of reducing the poisoning of the catalyst metal caused by the ionomer.

An electrochemical device according to a tenth aspect of the present disclosure comprises a membrane electrode assembly. The membrane electrode assembly includes a polymer electrolyte membrane; an anode on a one side of the polymer electrolyte membrane; and a cathode on another side opposite to the one side of the polymer electrolyte membrane, the anode and the cathode each including an electrode catalyst layer and a gas diffusion layer. In the electrochemical device described above, the electrode catalyst layer of the cathode is at least an electrode catalyst layer of an electrochemical device, the electrode catalyst layer comprising: a mesoporous material; a catalyst metal supported at least in the mesoporous material; and an ionomer, and before supporting the catalyst metal, the mesoporous material has mesopores with a mode radius of 1 nm to 25 nm and a pore volume of 1.0 $cm^3/g$ to 3.0 $cm^3/g$ and has an average particle diameter of 200 nm or more.

According to the structure described above, since the cathode at least includes the electrode catalyst layer which includes the mesoporous material controlled to have the mode radius and the pore volume of the mesopores described above and to have an average particle diameter of 200 nm or more, the poisoning of the catalyst metal caused by the ionomer can be reduced at least at a cathode side.

Hence, the electrochemical device according to the ninth aspect of the present disclosure has an effect of reducing the poisoning of the catalyst metal caused by the ionomer.

A method according to a eleventh aspect of the present disclosure is a method for manufacturing an electrode catalyst layer of an electrochemical device, the electrode catalyst layer including a mesoporous material, a catalyst metal supported at least in the mesoporous material, and an ionomer, and the method described above comprises: preparing a mesoporous material which has mesopores with a mode radius of 1 nm to 25 nm and a pore volume of 1.0 $cm^3/g$ to 3.0 $cm^3/g$ and which has an average particle diameter of 200 nm or more; applying the catalyst metal so as to be supported in the mesoporous material to form a catalyst; mixing materials including the catalyst, a solvent, and an ionomer to form a catalyst ink; and applying the catalyst ink to a substrate.

In a method for manufacturing an electrode catalyst layer of an electrochemical device according to an twelfth aspect of the present disclosure, the average particle diameter of the mesoporous material according to the eleventh aspect described above may be 800 nm or less.

In a method for manufacturing an electrode catalyst layer of an electrochemical device according to a thirteenth aspect of the present disclosure, the mode radius of the mesopores according to the tenth or the twelfth aspect described above may be 3 nm to 6 nm.

In a method for manufacturing an electrode catalyst layer of an electrochemical device according to a fourteenth aspect of the present disclosure, the materials according to any one of the eleventh to the thirteenth aspects described above may further include at least one of carbon black and carbon nanotubes.

In a method for manufacturing an electrode catalyst layer of an electrochemical device according to a fifteenth aspect of the present disclosure, the carbon black according to the fourteenth aspect described above may be Ketjen black.

In a method for manufacturing an electrode catalyst layer of an electrochemical device according to a sixteenth aspect of the present disclosure, the mesoporous material according to one of the eleventh to fifteenth aspect described above may be a mesoporous carbon.

In a method for manufacturing an electrode catalyst layer of an electrochemical device according to a seventeenth aspect of the present disclosure, a weight ratio of the catalyst metal to the mesoporous material according to sixteenth aspect described above may be 0.65 to 1.5.

In a method for manufacturing an electrode catalyst layer of an electrochemical device according to a eighteenth aspect of the present disclosure, a weight ratio of the ionomer to a total of carbon included in the electrode catalyst layer according to any one of the tenth to the sixteenth or seventeenth aspect described above may be 0.7 to 0.9.

Hereinafter, embodiments of the present disclosure will be described with reference to the drawings. In addition, hereinafter, identical or corresponding components will be designated by the same reference numeral through all the drawings, and description thereof may be omitted in some cases.

Embodiments

As an electrochemical device according to the embodiment of the present disclosure, although a fuel cell will be described by way of example, the electrochemical device is not limited thereto and may be a water electrolysis device in which water is electrolyzed to manufacture hydrogen and oxygen.

(Membrane Electrode Assembly)

Figure 3:
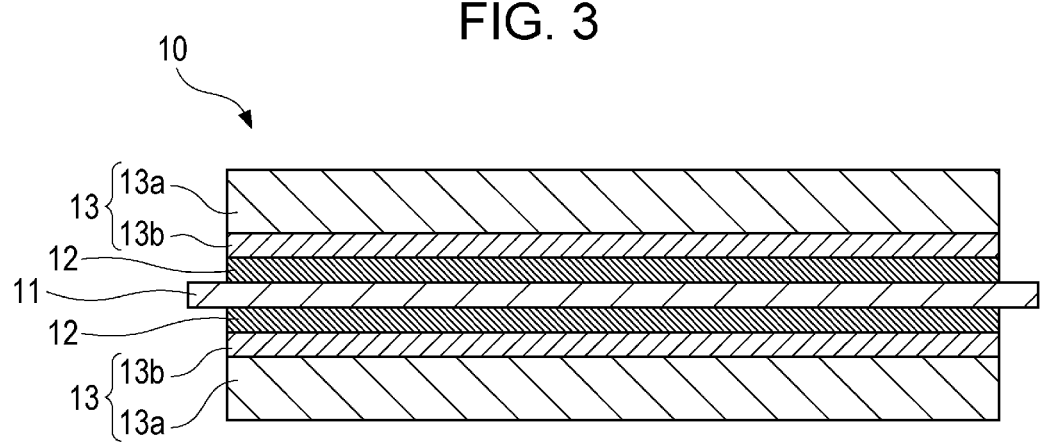
FIG. 3 is a schematic view showing one example of the structure of a membrane electrode assembly of an electrochemical device according to an embodiment of the present disclosure.

First, with reference to FIG. 3, the structure of a membrane electrode assembly (MEA) 10 of the electrochemical device according to the present disclosure will be described. FIG. 3 is a schematic view showing one example of the structure of the membrane electrode assembly (MEA) 10 of the electrochemical device according to the embodiment of the present disclosure.

As shown in FIG. 3, the membrane electrode assembly (MEA) 10 includes a polymer electrolyte membrane 11, an anode, and a cathode, each electrode having an electrode catalyst layer 12 and a gas diffusion layer 13, and the anode and the cathode are provided so as to sandwich the polymer electrolyte membrane 11. That is, as shown in FIG. 3, a pair of the electrode catalyst layers 12 is formed at two sides of the polymer electrolyte membrane 11, and furthermore, a pair of the gas diffusion layers 13 is disposed so as to sandwich the pair of the electrode catalyst layers 12.

(Polymer Electrolyte Membrane)

Since the polymer electrolyte membrane 11 is responsible for ion (proton) conduction between the cathode and the anode and is required to have both a proton conductivity and a gas barrier property, as the polymer electrolyte membrane 11, for example, an ion-exchange fluorine-containing resin membrane or an ion-exchange hydrocarbon-based resin membrane may be mentioned by way of example. In particular, since having a high proton conductivity and being stably present under a power generation environment of a fuel cell, a perfluorosulfonic acid resin membrane is preferable. The ion-exchange amount of the ion-exchange resin is preferably 0.9 to 2.0 milliequivalent/g of dry resin. When the ion-exchange amount is 0.9 milliequivalent/g of dry resin or more, a high proton conductivity can be easily obtained, and when the ion-exchange amount is 2.0 milliequivalent/g of dry resin or less, swelling of the resin caused by water absorption thereof can be suppressed, so that the change in dimension of the polymer electrolyte membrane 11 can be preferably reduced. In addition, the thickness of the polymer electrolyte membrane 11 is preferably 5 to 50 When the thickness is 5 μm or more, a high gas barrier property can be obtained, and when the thickness is 50 μm or less, a high proton conductivity can be obtained.

(Gas Diffusion Layer)

The gas diffusion layer 13 is a layer simultaneously having a current collection function, a gas permeability, and a hydrophobic property and, as shown in FIG. 3, may have the structure including two layers, that is, a substrate 13a and a coating layer 13b. The substrate 13a may be formed of a material excellent in electrical conductivity and permeability of a gas and a liquid, and for example, a porous material, such as carbon paper, a carbon fiber cloth, or a carbon fiber felt, may be mentioned. The coating layer 13b is provided between the substrate 13a and the electrode catalyst layer 12 and is a layer which reduces the contact resistance therebetween and improves a liquid permeability (drainage property). The coating layer 13b is formed, for example, using an electrically conductive material, such as carbon black, and a hydrophobic resin, such as a polytetrafluoroethylene (PTFE), as a primary component.

(Electrode Catalyst Layer)

The electrode catalyst layer 12 is a layer which increases the rate of an electrochemical reaction of the electrode. The electrode catalyst layer 12 includes a mesoporous carbon, a catalyst metal, and an ionomer (proton conductive resin) and has the structure in which the catalyst metal is supported at least in the mesoporous carbon.

Before supporting the catalyst metal, the mesoporous carbon according to the embodiment of the present disclosure preferably has mesopores with a mode radius of 1 to 25 nm and a pore volume of 1.0 to 3.0 cm$^3$/g. When the pore volume of the mesopores is 1.0 cm$^3$/g or more, a large amount of the catalyst metal is preferably supported in the mesoporous carbon, and when the pore volume is 3.0 cm$^3$/g or less, the strength of the structure of the mesoporous carbon is preferably increased.

Furthermore, in the mesoporous carbon according to the embodiment of the present disclosure, the mode radium of the mesopores may also be set to 3 to 6 nm. In particular, the mode radius of the mesopores is preferably set to 3 to 4 nm. When the mode radius of the mesopores is 3 nm or more, a gas can be preferably easily supplied into the pores, and when the mode radius is 6 nm or less, the ionomer is preferably unlikely to intrude into the pores.

Furthermore, the mesoporous carbon according to the embodiment of the present disclosure is formed to have an average particle diameter is 200 to 1,000 nm. When the average particle diameter is 200 nm or more, the rate of the catalyst metal to be poisoned by the ionomer is decreased. Hence, when the average particle diameter is set to 200 nm or more, for example, compared to a related electrode catalyst layer, the catalyst activity can be improved (see "EXAMPLES" to be described later).

In addition, when the average particle diameter is 1,000 nm or less, a reaction gas is likely to be supplied to the catalyst metal supported in the mesoporous carbon. In addition, as described below, when the particle diameter of the mesoporous carbon is set to 800 nm or less, it is possible to supply oxygen to the catalyst metal equal to or faster than the conventional catalyst layer and is thus preferable.

That is, when the particle diameter of the mesoporous carbon is increased, there may be a merit in that the poisoning of the catalyst metal caused by the ionomer can be reduced. On the other hand, there may also be a demerit in that a reaction gas, such as oxygen, cannot be sufficiently supplied to the catalyst metal in the mesoporous carbon.

Figure 4:
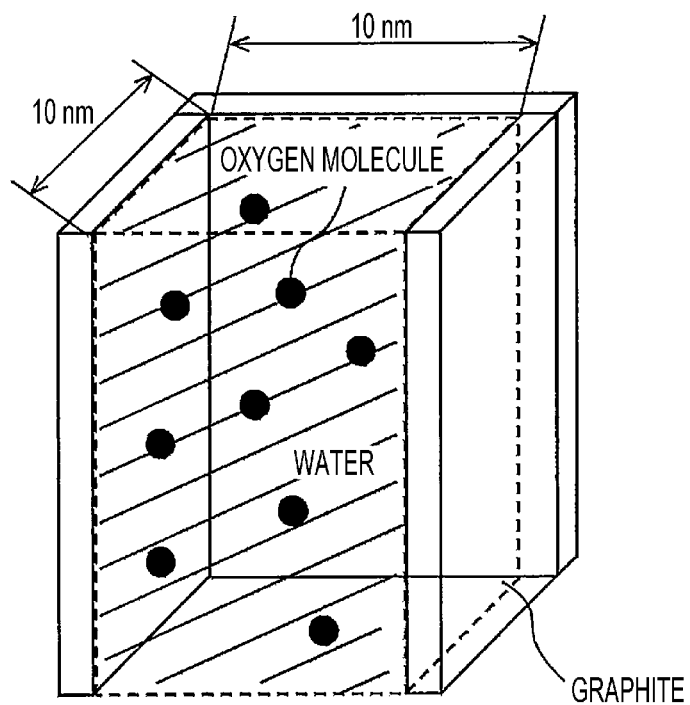
FIG. 4 is a view of a model simulating the inside of a mesoporous carbon having a mesopore with a radius of 5 nm.
Figure 5:
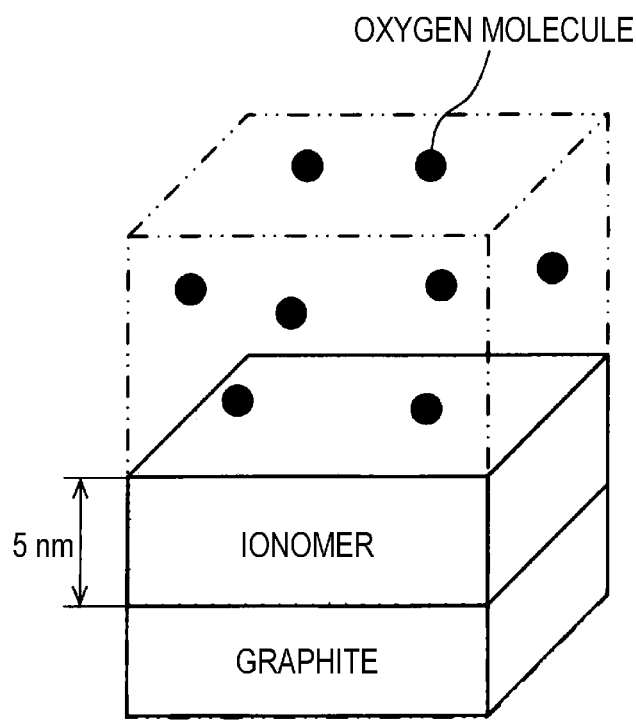
FIG. 5 is a view of a model simulating a catalyst-covering ionomer.

Accordingly, by a molecular dynamics calculation, the oxygen diffusion resistance of the catalyst in which the catalyst metal is present in the mesoporous carbon according to the embodiment of the present disclosure and that of a related catalyst in which a catalyst metal is covered with an ionomer were estimated using models shown in FIGS. 4 and 5. In addition, for this molecular dynamics calculation, material property simulation software J-OCTA was used. FIG. 4 is a view of the model simulating the inside of a mesoporous carbon having mesopores with a radius of 5 nm. For the convenience of illustration, the plane of graphite to be disposed at the most front side on the plane of FIG. 4 is omitted. FIG. 5 is a view of the model simulating a catalyst-covering ionomer.

In FIG. 4, graphite planes are arranged at four sides to form a hole having an internal diameter of 10 nm, and the hole thus formed is used as the model of the mesopore of the mesoporous carbon. On the other hand, in FIG. 5, an ionomer having a thickness of 5 nm is provided to cover graphite, so that the model simulating the catalyst-covering ionomer is formed. In addition, in general, it has been known that the covering thickness of the ionomer is approximately 5 nm. In addition, the behavior of a reaction gas (oxygen) in each model was simulated in accordance with the molecular dynamics method.

In this case, in order to simulate an operation condition at a relative humidity of 100%, the mesopores of the mesoporous carbon were filled with water. In addition, the moisture content of the ionomer was set to 16%. Under the conditions as described above, the molecular dynamics calculation was performed, so that the oxygen diffusion coefficient in the mesopore of the mesoporous carbon and that in the ionomer were obtained as 7.8×10$^{-9}$ and 9.2×10$^{-11}$ (m$^2$/s), respectively. By the use of the oxygen diffusion coefficients thus obtained, the oxygen diffusion resistance of the mesoporous carbon and that of the catalyst-covering ionomer were obtained. By the use of an oxygen diffusion coefficient (DO$_2$) and a diffusion length (L), an oxygen diffusion resistance (RO$_2$) can be obtained by the following equation (1).

$$RO_2 = L/DO_2 \tag{1}$$

Hence, the oxygen diffusion resistance in the mesopore of the mesoporous carbon was 1.3×10$^8$×L$_{MPC}$ (s/m), and the oxygen diffusion resistance in the catalyst-covering ionomer was 1.1×10$^{10}$×L$_{ionomer}$ (s/m).

In addition, the diffusion length L$_{MPC}$ in the mesopore of the mesoporous carbon may be regarded as the particle radius of the mesoporous carbon, and the diffusion length L$_{ionomer}$ of the catalyst-covering ionomer may be regarded as the covering thickness of the ionomer. In addition, since the covering thickness (L$_{ionomer}$) of the ionomer is 5 nm, the oxygen diffusion resistance in the catalyst-covering ionomer can be obtained. In addition, when the oxygen diffusion resistance in the mesopore of the mesoporous carbon is approximately equal to the oxygen diffusion resistance in the catalyst-covering ionomer, if the diffusion length L$_{MPC}$ is equal to or less than the particle radius of the mesoporous carbon, an oxygen transport performance equivalent to or more than that of a related electrode catalyst layer can be obtained. Hence, when the particle radius of the mesoporous carbon is set to 400 nm or less, that is, when the particle diameter of the mesoporous carbon is set to 800 nm or less, the electrode catalyst layer 12 according to the embodiment of the present disclosure can supply oxygen to the catalyst metal equal to or faster than the conventional catalyst layer.

In addition, the pore volume and the mode radius of the mesopores included in the above mesoporous carbon can be obtained by measurement using a nitrogen adsorption method, followed by analysis using a method, such as a Barrett-Joyner-Halenda (BJH) method, a density functional theory (DFT) method, or a quenched solid density functional theory (QSDFT) method.

In addition, the average particle diameter of the mesoporous carbon may be measured by a laser diffraction particle size distribution measuring apparatus or the like in the state in which the mesoporous carbon is dispersed in a solvent or may be observed using a scanning electron microscope (SEM) or a transmission type electron microscope (TEM). When the particle size distribution is measured by dispersing the mesoporous carbon in a solvent, the mesoporous carbon particles are required not to be agglomerated to each other. Accordingly, as the solvent, water, an alcohol, or a mixed solvent of water and an alcohol may be preferably used. In addition, in order to increase the dispersibility, a dispersant is preferably added to the solvent. As the dispersant, for example, a perfluorosulfonic acid resin, a poly(oxyethylene) octyl phenyl ether, or a poly(oxyethylene)sorbitan monolaurate may be mentioned. In order to further increase the dispersibility, after the solvent and the mesoporous carbon are mixed together, a dispersion treatment is preferably performed. As a dispersion treatment device, for example, an ultrasonic homogenizer, a wet-type jet mill, a ball mill, or a mechanical stirring machine may be mentioned.

In addition, although a method for manufacturing the mesoporous carbon included in the electrode catalyst layer 12 according to the embodiment of the present disclosure is not particularly limited, for example, a method disclosed in Japanese Unexamined Patent Application Publication No. 2010-208887 may be preferably used. The mesoporous carbon manufactured by the method as described above has the structure in which the mesopores have a large pore volume and are communicated to each other.

Hence, the catalyst metal is likely to be supported in the pores, and a gas is likely to be supplied to the catalyst metal thus supported. In addition, in order to control the average particle diameter of the mesoporous carbon, after the synthesis thereof, a pulverization treatment may be performed. As a pulverizing device, for example, there may be mentioned a wet-type bead mill, a dry-type bead mill, a wet-type ball mill, a dry-type ball mill, a wet-type jet mill, or a dry-type jet mill. Among those mills mentioned above, a wet-type bead mill is preferably used since the mesoporous carbon can be pulverized to have a fine particle diameter.

As the catalyst metal included in the electrode catalyst layer 12, for example, platinum (Pt), ruthenium (Ru), palladium (Pd), iridium (Ir), silver (Ag), or gold (Au) may be mentioned. In particular, platinum or an alloy thereof is preferable since having a high catalytic activity to an oxygen reduction reaction and good durability in a power generation environment of a fuel cell. In addition, the catalyst metal is preferably in the form of particles. The average particle diameter of the catalyst metal may be set, for example, to 1 to 20 nm and may be further set to 1 to 10 nm. When the average particle diameter of the catalyst metal is 10 nm or less, the surface area per unit weight of the catalyst metal is increased, and the reactivity thereof is improved. In addition, when the average particle diameter of the catalyst metal is 1 nm or more, the stability of fine particles is improved, and for example, the metal is not likely to be dissolved in the power generation environment of the fuel cell.

In addition, a weight ratio of the catalyst metal to the mesoporous carbon is preferably 0.65 to 1.5. When the amount of the catalyst metal per unit area of the mesoporous carbon is increased, and the weight ratio of the catalyst metal is increased out of the weight ratio described above, the catalyst metal may be agglomerated in some cases. On the other hand, when the amount of the catalyst metal per unit area of the mesoporous carbon is decreased, and the weight ratio of the catalyst metal is decreased out of the weight ratio described above, the amount of the mesoporous carbon is increased in order to secure a required amount of the catalyst metal, and as a result, the thickness of the electrode catalyst layer 12 is unfavorably increased in some cases.

As the ionomer (proton conductive resin), an ion-exchange resin may be used. In particular, a perfluorosulfonic acid resin is preferable since having a high proton conductivity and being stably present even in the power generation environment of the fuel cell. The ion-exchange amount of the ion-exchange resin may be set to 0.9 to 2.0 milliequivalent/g of dry resin. When the ion-exchange amount is 0.9 milliequivalent/g of dry resin or more, a high proton conductivity is likely to be obtained, and when the ion-exchange amount is 2.0 milliequivalent/g of dry resin or less, swelling of the resin by water absorption thereof is suppressed, and the gas diffusivity in the electrode catalyst layer 12 is not likely to be disturbed.

In addition, a weight ratio of the ionomer to a total of carbon included in the electrode catalyst layer 12 is preferably 0.7 to 0.9.

In order to enhance the drainage property, carbon black or carbon nanotubes may be added to the electrode catalyst layer 12. In general, an electrode catalyst layer including carbon particles with an average particle diameter of 10 to 100 nm is able to obtain a higher drainage property by a capillary force. However, since the average particle diameter of the mesoporous carbon used for the electrode catalyst layer 12 according to the embodiment of the present disclosure is 200 nm or more, a problem of drainage property may arise in some cases. Accordingly, at least one of carbon black and carbon nanotubes may be added to the electrode catalyst layer 12. By the structure as described above, since the drainage property of the electrode catalyst layer 12 can be enhanced, the power generation performance of the fuel cell can be improved.

In addition, as the carbon black, for example, there may be mentioned Ketjen black, acetylene black, Vulcan, or black pearl. As the carbon nanotubes, for example, monolayer carbon nanotubes or multilayer carbon nanotubes may be mentioned. In particular, since an aggregate is linearly grown in Ketjen black, even by a small addition amount thereof, an effective drainage path can be preferably formed in the electrode catalyst layer 12.

As a method for forming the electrode catalyst layer 12 according to the embodiment of the present disclosure, for example, a method which is generally used for a fuel cell may be used. For example, after the materials described above are dispersed in a solvent containing water and/or an alcohol, this dispersion is applied to a substrate, such as a polymer electrolyte membrane, a gas diffusion layer, or one of various transfer films, followed by drying, so that the electrode catalyst layer 12 is formed.

In addition, the electrode catalyst layer 12 according to the embodiment of the present disclosure described above may be used as a cathode-side electrode catalyst layer. In addition, the electrode catalyst layer 12 described above may also be used as an anode-side electrode catalyst layer. Alternatively, the anode-side electrode catalyst layer may have a structure similar to that of a related electrode catalyst layer which is generally used in the membrane electrode assembly 10 of the fuel cell. That is, in the membrane electrode assembly 10, the electrode catalyst layer 12 having the structure described above is preferably used at least as the cathode-side electrode catalyst layer.

In addition, when having the structure similar to that of a related electrode catalyst layer, the anode-side electrode catalyst layer can be formed as described below. For example, after a platinum catalyst supported by carbon black and a perfluorosulfonic acid resin are dispersed in a solvent containing water and/or an alcohol, this dispersion is applied to a substrate, such as a polymer electrolyte membrane, a gas diffusion layer, or one of various transfer films, followed by drying, so that the electrode catalyst layer can be formed.

The polymer electrolyte membrane 11, a pair of the electrode catalyst layers 12 (the cathode electrode catalyst layer and the anode electrode catalyst layer), and a pair of the gas diffusion layers 13 (the cathode gas diffusion layer and the anode gas diffusion layer) are integrally assembled together, so that the membrane electrode assembly 10 according to the embodiment of the present disclosure can be obtained.

Figure 6:
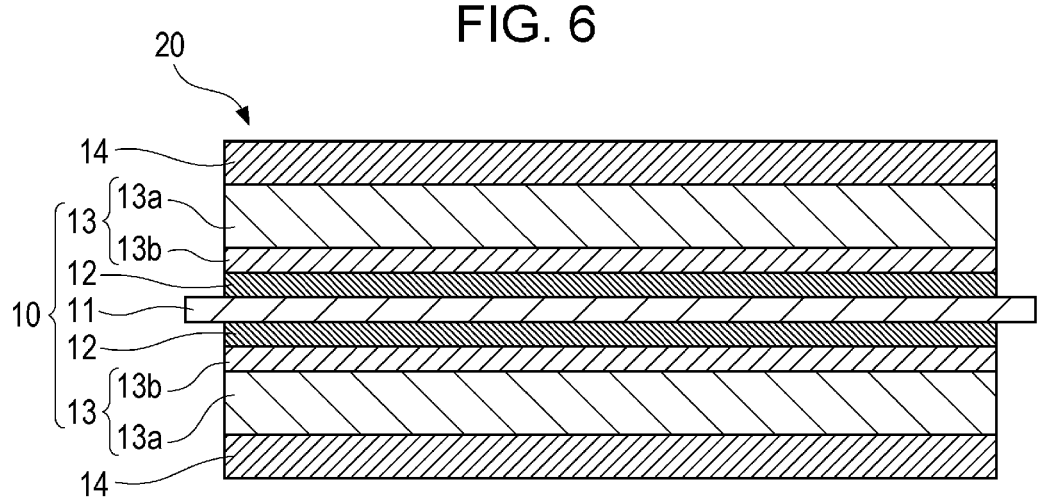
FIG. 6 is a schematic view showing one example of the structure of a single cell of a fuel cell, the single cell using the membrane electrode assembly shown in FIG. 3.

In addition, as shown in FIG. 6, a single cell 20 can be formed by sandwiching the two sides of the membrane electrode assembly 10 shown in FIG. 3 by a pair of separators 14 each also functioning as a supply path of a reaction gas (hydrogen or oxygen). In addition, when the single cells 20 described above are collectively assembled together, for example, a fuel cell stack can be formed. In addition, FIG. 6 is a schematic view showing one example of the structure of the single cell 20 of the fuel cell, the single cell 20 using the membrane electrode assembly 10 shown in FIG. 3.

Examples

Hereinafter, examples of the present disclosure will be described. First, mesoporous carbon supports (hereinafter, referred to as "supports A to D") shown in FIG. 7 were prepared as described below. FIG. 7 is a table showing the average particle diameter, the mesopore volume, the mesopore mode radius, and the BET specific surface area of each of the mesoporous carbon supports according to the examples of the present disclosure. In addition, among the supports A to D, the supports A to C were each formed from a mesoporous carbon having an average particle diameter of 200 nm or more, and the support D was formed from a mesoporous carbon having an average particle diameter 200 nm or less. In addition, as shown in FIG. 7, the supports A to D each had mesopores having a mode radius of 1 to 25 nm, and the pore volume of the mesopores is in a range of 1.0 to 3.0 cm$^3$/g.

As the support A, a commercially available mesoporous carbon (CNovel, manufactured by Toyo Tanso Co., Ltd.) was used.

The support B was formed by pulverizing the support A in accordance with the following method. That is, the support A was charged in a solvent containing water and ethanol at a volume ratio of 1:1 to prepare a slurry having a solid component concentration of 3 percent by weight. After zirconia beads having a diameter of 0.3 mm were charged to this slurry, a pulverization treatment was performed under a condition at a circumference rate of 12 m/s by using a medium stirring wet-type bead mill (Labstar Mini, manufactured by Ashizawa Finetech Ltd.). After the zirconia beads were taken out of the slurry processed by the pulverization treatment, the solvent was removed by evaporation, and an agglomerate thus obtained was ground using a mortar, so that the support B was formed.

Except that a pulverization treatment was performed using zirconia beads having a diameter of 0.1 mm under a condition at a circumference rate of 8 m/s, the support C was formed by a method similar to that of the support B.

Except that a pulverization treatment was performed using zirconia beads having a diameter of 0.1 mm under a condition at a circumference rate of 14 m/s, the support D was formed by a method similar to that of the support B.

The average particle diameter of the mesoporous carbon of each of the supports A to D was measured by the following method. The mesoporous carbon was charged to a mixed solvent containing water and ethanol at a volume ratio of 1:1, so that a slurry having a solid component concentration of 3 percent by weight was prepared. After an ionomer (Nafion, manufactured by du Pont) was charged to this slurry so that the weight ratio thereof to the carbon was 2, and an ultrasonic dispersion treatment was performed, the average particle diameter (d50) was measured by a laser diffraction particle size distribution measuring apparatus (Microtrac HRA, manufactured by MicrotracBEL Corporation).

The mesopore volume, the mesopore mode radius, and the BET specific surface area of the mesoporous carbon were measured by a nitrogen adsorption device (Autosorb-iQ, manufactured by Quantachrome Corporation). In addition, before the measurement, a heat treatment was performed at 200° C. for 3 hours, so that moisture contained in the mesoporous carbon was sufficiently dried.

Subsequently, catalysts A to D were prepared as shown in FIG. 8 using the supports A to D shown in FIG. 7. The catalysts A to D were formed by supporting platinum on the supports A to D, respectively, at a platinum supporting rate of approximately 50 percent by weight. In addition, a catalyst E was also prepared. For the catalyst E, a commercially available platinum-supporting carbon black catalyst (TEC10E50E, manufactured by Tanaka Kikinzoku Kogyo) was used. In addition, FIG. 8 is a table showing the carbon support, the platinum supporting rate, the platinum specific surface area, and the BET specific surface area of the catalyst according to each of the examples of the present disclosure. In the examples of the present disclosure, by the use of the catalysts A to E shown in FIG. 8, cathode electrode catalyst layers of Examples 1 to 3 and Comparative Examples 1 and 2 were formed.

First, the cathode electrode catalyst layer of Example 1 was formed by the following method. The catalyst A and Ketjen black (EC300J, manufactured by Lion Specialty Chemicals Co., Ltd.), the weight of which was ½ of the weight of the mesoporous carbon included in the catalyst A, were charged in a mixed solvent containing water and ethanol at a volume ratio of 1:1 and were then stirred to form a slurry. After an ionomer (Nafion, manufactured by du Pont) was charged to this slurry thus obtained so that the weight ratio thereof to the total carbon (the mesoporous carbon+the Ketjen black) was 0.8, an ultrasonic dispersion treatment was performed. A catalyst ink thus obtained was applied on a polymer electrolyte membrane (Gore Select III, manufactured by Nippon Gore Co., Ltd.) by a spray method, so that the cathode electrode catalyst layer was formed.

Next, the cathode electrode catalyst layer of Example 2 was formed. Except that the catalyst B was used instead of using the catalyst A, the cathode electrode catalyst layer of Example 2 was formed by the same method as that of the cathode electrode catalyst layer of Example 1.

Next, the cathode electrode catalyst layer of Example 3 was formed. Except that the catalyst C was used instead of using the catalyst A, the cathode electrode catalyst layer of Example 3 was formed by the same method as that of the cathode electrode catalyst layer of Example 1.

Next, the cathode electrode catalyst layer of Comparative Example 1 was formed. Except that the catalyst D was used instead of using the catalyst A, the cathode electrode catalyst layer of Comparative Example 1 was formed by the same method as that of the cathode electrode catalyst layer of Example 1.

Next, the cathode electrode catalyst layer of Comparative Example 2 was formed. Except that the catalyst E was used instead of using the catalyst A, and no Ketjen black was added, the cathode electrode catalyst layer of Comparative Example 2 was formed by the same method as that of the cathode electrode catalyst layer of Example 1. In addition, when the cathode electrode catalyst layer of Comparative Example 2 was formed, since no Ketjen black was added, the Ketjen black included in the cathode electrode catalyst layer of Comparative Example 2 was only the Ketjen black included in the catalyst E.

As described above, in Examples 1 to 3, the cathode electrode catalyst layers were each formed from the catalyst using the mesoporous carbon which had mesopores with a mode radius of 1 to 25 nm and a pore volume of 1.0 to 3.0 $cm^3/g$ and which had an average particle diameter of 200 nm or more. In Comparative Example 1, the cathode electrode catalyst layer was formed from the catalyst using the mesoporous carbon which had mesopores with a mode radius of 1 to 25 nm and a pore volume of 1.0 to 3.0 $cm^3/g$ and which had an average particle diameter of less than 200 nm. In addition, in Comparative Example 2, the cathode electrode catalyst layer was formed from the catalyst using Ketjen black EC instead of using the mesoporous carbon as the support, that is, a related electrode catalyst layer was formed.

In an assembly of the cathode electrode catalyst layer thus obtained and the polymer electrolyte membrane, on a surface of the polymer electrolyte membrane opposite to the surface on which the cathode electrode catalyst layer was formed, an anode electrode catalyst layer was formed, so that a membrane catalyst layer assembly was formed. In addition, the anode electrode catalyst layers of Examples 1 to 3 and Comparative Examples 1 and 2 had the same specification and were each formed by the same method as that of the cathode electrode catalyst layer of Comparative Example 2.

After a gas diffusion layer (GDL25BC, manufactured by SGL Carbon Japan) was provided on each of the cathode electrode catalyst layer and the anode electrode catalyst layer of the membrane catalyst layer assembly thus obtained, a pressure of 7 $kgf/cm^2$ was applied thereto at a high temperature of 140° C. for 5 minutes, so that a membrane electrode assembly was formed.

The membrane electrode assembly thus obtained was sandwiched with separators each having a serpentine-shaped flow path and was then incorporated in a predetermined jig, so that a single cell of a fuel cell was formed.

By the use of the single cell thus formed, the catalyst activity of each of Examples 1 to 3 and Comparative Examples 1 and 2 was evaluated by the following method.

First, the temperature of the single cell was maintained at 80° C., and hydrogen having a dew point of 80° C. and oxygen having a dew point of 80° C. were supplied to an anode side and a cathode side, respectively, the flow rate of each of which was set to be sufficiently higher than the amount to be consumed by the reaction. In this case, by the use of an electronic load device (PLZ-664WA, manufactured by Kikusui Electronics Corporation), the voltage of the single cell of each of Examples 1 to 3 and Comparative Examples 1 and 2 was measured during a constant current operation. In addition, during the measurement, the electrical resistance of the single cell was in-situ measured by a low resistance meter having a fixed frequency of 1 kHz. From the current-voltage curve obtained after the correction based on the electrical resistance component of the single cell, a current at 0.9 V was read and normalized by the amount of platinum contained in the cathode electrode catalyst layer, so that the index of the catalyst activity was obtained. This index is called a mass activity at 0.9 V and has been generally used as an index showing the catalyst activity of the fuel cell.

The mass activity thus obtained is represented by the value relative to that of Comparative Example 2 and is shown in the above FIG. 1. As shown in FIG. 1, it is found that as the particle diameter of the mesoporous carbon is increased, a higher catalyst activity can be obtained. In addition, as shown in FIG. 8, the platinum specific surface areas of the catalysts are not so much different from each other. Furthermore, the experimental results of the examples well coincide with the result of the catalyst activity calculated using the model shown in FIG. 2.

From the above description, many improvements and other embodiments of the present disclosure can be easily conceived by a person skilled in the art. Hence, it is to be understood that the above description is described by way of example and is provided to suggest the best mode of carrying out the present disclosure to a person skilled in the art. The details of the structures and/or the functions described above may be substantially modified and/or changed without departing from the spirit of the present disclosure.

The present disclosure is effectively used, for example, for an electrode catalyst layer of a membrane electrode assembly which forms a cell of a fuel cell.

What is claimed is:

1. A method for manufacturing an electrode catalyst layer of an electrochemical device, the electrode catalyst layer including a mesoporous material, a catalyst metal supported at least in the mesoporous material, and an ionomer, and at least one of carbon black and carbon nanotubes, the method comprising:

preparing a mesoporous material which has mesopores with a mode radius of 1 nm to 25 nm and a pore volume of 1.0 $cm^3/g$ to 3.0 $cm^3/g$ and which has an average particle diameter of 200 nm or more and 800 nm or less;

applying the catalyst metal so as to be supported in the mesoporous material to form a catalyst;

after forming the catalyst from the mesoporous material and the catalyst metal, mixing materials including (1) the catalyst, (2) a solvent, (3) the ionomer, and (4) the at least one of carbon black having an average particle diameter less than the average particle diameter of the mesoporous material and carbon nanotubes having an average particle diameter less than the average particle diameter of the mesoporous material to form a catalyst ink; and applying the catalyst ink to a substrate.

2. The method for manufacturing an electrode catalyst layer of an electrochemical device according to claim 1, wherein the mode radius of the mesopores is 3 nm to 6 nm.

3. The method for manufacturing an electrode catalyst layer of an electrochemical device according to claim 1, wherein the carbon black is Ketjen black.

4. The method for manufacturing an electrode catalyst layer of an electrochemical device according to claim 1, wherein the mesoporous material is a mesoporous carbon.

5. The method for manufacturing an electrode catalyst layer of an electrochemical device according to claim 4, wherein a weight ratio of the catalyst metal to the mesoporous material is 0.65 to 1.5.

6. The method for manufacturing an electrode catalyst layer of an electrochemical device according to claim 4, wherein a weight ratio of the ionomer to a total of carbon included in the electrode catalyst layer is 0.7 to 0.9.

7. The method for manufacturing an electrode catalyst layer of an electrochemical device according to claim 1, wherein the average particle diameter of the at least one of carbon black and carbon nanotubes is 10 to 100 nm.

* * * * *